Patented May 13, 1941

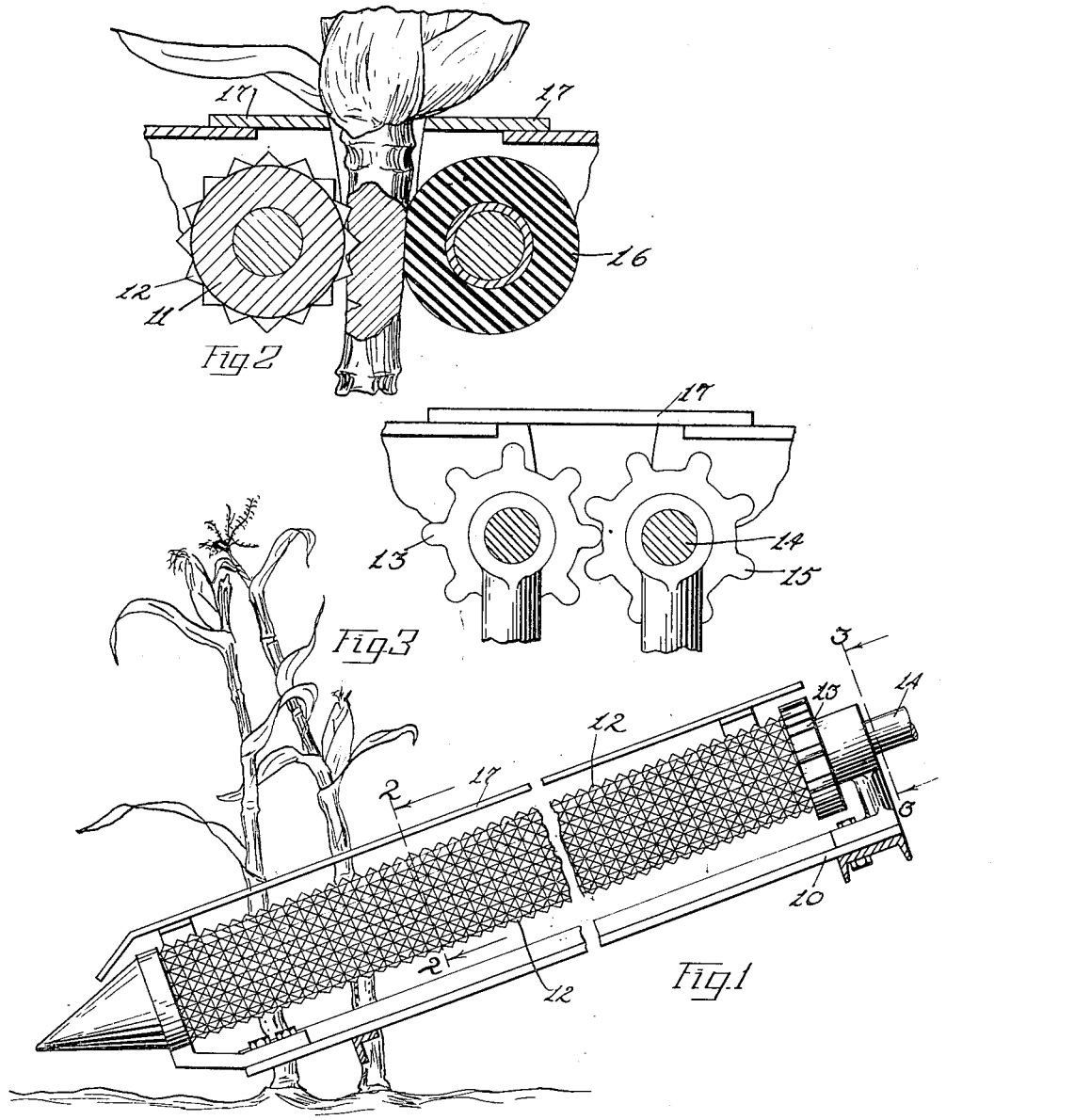

2,241,928

UNITED STATES PATENT OFFICE 2,241,928

CORN SNAPPING MACHINE

Claude K. Shedd and Edgar V. Collins, Ames, Iowa, assignors to Iowa State College Research Foundation, Ames, Iowa, a corporation of Iowa Application August 10, 1939, Serial No. 289,422

2 Claims. (Cl. 56—107)

The object of our invention is to provide a corn snapping machine of simple, durable and inexpensive construction in which the corn stalks, both large and small, are firmly gripped between two rolls and pulled downwardly between them without breaking or crushing the stalks or pulling them up, and in which the ears are prevented from entering between the rolls and, hence, are not shelled or crushed but are snapped from the stalks by snapping bars above the rolls as the stalks are drawn downwardly between the rolls.

In the accompanying drawing:

Figure 1 shows a side elevation of a corn snapping machine embodying our invention;

Figure 2 shows an enlarged detail sectional view on the line 2—2 of Figure 1; and Figure 3 shows an enlarged detail sectional view on the line 3—3 of Figure 1.

The reference numeral 10 indicates a portion of a frame for a machine embodying our invention, and it is to be understood that this frame is of the type now in common use on so-called corn harvesters, and the frame is intended to be advanced over a corn field and power applied to operate the husking rolls.

One of the husking rolls which is mounted in the frame for rotation in the ordinary manner is indicated by the numeral 11, and is provided on its surface with a series of sharp pointed projections 12 extended outwardly beyond the surface of the roll whereby these projections may penetrate corn stalks without breaking or crushing them and, yet, firmly grip the corn stalks.

At one end of the roll is a gear wheel 13. The other roll has a central shaft 14 to which is fixed a gear wheel 15 in mesh with the gear 13, and this constitutes what we have referred to as means for rotating the rolls. Power operated means not shown are provided for rotating the shaft 14.

Mounted on the shaft 15 is a roll 16, made of yielding material such as rubber. These rolls are arranged side by side and are inclined downwardly and forwardly. These rolls are arranged so close together that relatively small corn stalks cannot pass downwardly between them without having the yielding roll press the corn stalk against the pointed sharpened projections 12 enough to firmly grip the stalk between the yielding roll and the sharpened projections, and the roll 16 is of such yielding character that when relatively large stalks pass downwardly between the rolls they will form depressions in the yielding roll. By this means our machine automatically adapts itself for both large and small corn stalks.

Mounted on the frame above each roll is a snapping bar 17 arranged side by side and close to the upper surface of each roll, and these snapping bars are spaced apart to such a distance that large corn stalks may pass downwardly between the bars, but ears of corn cannot pass downwardly between the bars.

In Fig. 2 we have illustrated stalks of corn positioned between the rolls, with the ears above the snapping bars, and the stalks held thereby in upright positions, we have illustrated a relatively large stalk of corn positioned between the rolls with the sharpened projections entering one side of the stalk and the yielding roll being depressed to permit the stalk to pass through without breaking or crushing, and to firmly hold the stalk into gripping engagement with the sharpened projections 12; and in this figure an ear of corn is shown on the stalk in position in engagement with the upper surface of the snapping bars, so that when the stalk is moved downwardly between the rolls the snapping bars will engage the butt of the ear and snap it from the stalk and prevent the ear or its husk from entering between the rolls where it might be shelled or crushed.

In practice, we have demonstrated that when our machine is being advanced over a field of ripened corn, the corn stalks pass between the rolls and the rolls grip the stalks so firmly that as the rolls are rotated the corn stalks are pulled downwardly between the rolls, and our rolls automatically adjust themselves to corn stalks of varying thickness; then when the ears on the stalks engage the snapping bars they cannot enter between them but will be held up by the snapping bars while the stalk itself is being pulled down between the rolls, and this snaps the ears from the stalks without injuring the ears.

Satisfactory results may be obtained by having both the rolls like the roll 11 with its sharpened projections, because these projections can be made to penetrate the stalks far enough so that they will engage and firmly grip both large and small stalks.

We claim as our invention:

1. In a corn snapping machine, the combination of a frame, two ear snapping bars arranged side by side and inclined downwardly and forwardly and spaced apart far enough to permit stalks of corn to pass between them and close enough together to prevent the entrance of ears of corn between them, two rollers arranged side by side one below each snapping bar and in substantially the same plane as the snapping bar, means for rotatably supporting the rollers in positions spaced apart far enough to permit a corn stalk to pass between them without being crushed or broken by the rollers, one of the rollers having pointed projections on its surface of such size and so positioned that several of them will at the same time puncture and enter a corn stalk between the rolls to thereby firmly grip the stalk and said projections being spaced apart from each other far enough to avoid crushing or breaking a corn stalk.

2. In a corn snapping machine, the combination of a frame, two ear snapping bars arranged side by side and inclined downwardly and forwardly and spaced apart far enough to permit stalks of corn to pass between them and close enough together to prevent the entrance of ears of corn between them, two rollers arranged side by side one below each snapping bar and in substantially the same plane as the snapping bar, means for rotatably supporting the rollers in positions spaced apart far enough to permit a corn stalk to pass between them without being crushed or broken by the rollers, one of the rollers having pointed projections on its surface of such size and so positioned that several of them will at the same time puncture and enter a corn stalk between the rolls to thereby firmly grip the stalk and said projections being spaced apart from each other far enough to avoid crushing or breaking a corn stalk, the other roller being formed of yielding material.

CLAUDE K. SHEDD.
EDGAR V. COLLINS.